(12) United States Patent
Handerek (10) Patent No.: US 10,837,806 B2
(45) Date of Patent: Nov. 17, 2020

(54) DISTRIBUTED OPTICAL FIBRE SENSORS

(71) Applicant: Fotech Group Limited, Fleet (GB)

(72) Inventor: Vincent Handerek, Essex (GB)

(73) Assignee: Fortech Group Limited, Hampshire (GB)

( * ) Notice: Subject to any disclaimer, the term of this patent is extended or adjusted under 35 U.S.C. 154(b) by 463 days.

(21) Appl. No.: 15/327,926

(22) PCT Filed: Jul. 17, 2015

(86) PCT No.: PCT/GB2015/052071
§ 371 (c)(1),
(2) Date: Jan. 20, 2017

(87) PCT Pub. No.: WO2016/012760
PCT Pub. Date: Jan. 28, 2016

(65) Prior Publication Data
US 2017/0205253 A1   Jul. 20, 2017

(30) Foreign Application Priority Data

Jul. 25, 2014 (GB) .................................. 1413242.7

(51) Int. Cl.
*G01D 5/353* (2006.01)
*G01H 9/00* (2006.01)

(52) U.S. Cl.
CPC .......... *G01D 5/3539* (2013.01); *G01H 9/004* (2013.01)

(58) Field of Classification Search
None
See application file for complete search history.

(56) References Cited

U.S. PATENT DOCUMENTS 6,389,191 B1   5/2002  Borreman et al.
2012/0230629 A1*  9/2012  Hill .................... G01D 5/35361
                                                    385/12

(Continued)

FOREIGN PATENT DOCUMENTS

DE   102010049780 A1   5/2012
EP       0585013 A1    3/1994

(Continued)

OTHER PUBLICATIONS

"Optical switching technology comparison: optical MEMS vs. other technologies" by X. Ma and G-S. Kuo, Published in IEEE Communications Magazine, vol. 41, Issue 11, Nov. 2003, pp. S16-S23 (Year: 2003).*

(Continued)

*Primary Examiner* — Randy W Gibson
*Assistant Examiner* — John M Royston
(74) *Attorney, Agent, or Firm* — Leydig, Voit & Mayer, Ltd.

(57) ABSTRACT

Distributed optical fibre sensor measures vibration, as a concurrent function of position along each of a plurality of sensing optical fibres, from properties of probe light backscattered within the sensing optical fibres. The sensor includes a light-pulse-generating probe light source, a detector, an optical switch. The sensor is arranged to control the optical switch such that all of the sensing optical fibres can be used concurrently to detect acoustic vibration, and an analyser is arranged to determine vibration, as a concurrent function of position along each of the sensing optical fibres, from the detected backscattered probe light.

30 Claims, 8 Drawing Sheets

(56) References Cited

U.S. PATENT DOCUMENTS

2013/0222811 A1* 8/2013 Handerek .......... G01M 11/3127
356/477
2014/0211202 A1* 7/2014 Niewczas .......... G01D 5/35316
356/73.1

FOREIGN PATENT DOCUMENTS

| EP | 2097880 A1 | | 9/2009 |
|---|---|---|---|
| JP | 2008-299238 A | | 12/2008 |
| JP | 2008299238 A | * | 12/2008 |
| WO | WO 2008/056143 A1 | | 5/2008 |
| WO | WO 2008/081157 A1 | | 7/2008 |
| WO | WO 2012/076873 A2 | | 6/2012 |

OTHER PUBLICATIONS

European Patent Office, International Search Report in International Patent Application No. PCT/GB2015/052071, dated Jan. 28, 2016, 6 pp.

European Patent Office, Written Opinion in International Patent Application No. PCT/GB2015/052071, dated Jan. 28, 2016, 8 pp.

Horiguchi et al., "Development of a Distributed Sensing Technique Using Brillouin Scattering," *J. of Lightwave Technology*, 13(7), Jul. 1995, pop. 1296-1302.

United Kingdom Intellectual Property Office, Search Report in United Kingdom Patent Application No. GB1413242.7, dated Mar. 31, 2015, 1 p.

* cited by examiner

DISTRIBUTED OPTICAL FIBRE SENSORS

CROSS-REFERENCE TO RELATED APPLICATIONS

This application is a national phase application of International Patent Application No. PCT/GB2015/052071, filed Jul. 17, 2015, which claims priority to Great Britain Application No. GB1413242.7, filed Jul. 25, 2014, both of which are incorporated by reference herein in their entireties for all purposes.

The present invention relates to sensors using multiple optical fibres. Aspects of the invention relate in particular to distributed optical fibre sensors in which one or more physical parameters are sensed as a function of position along a plurality of sensing optical fibres from properties of probe light backscattered within the sensing fibres. Such sensors may for example be optical time domain reflectometry (OTDR) sensors for use in sensing acoustic vibration, and such sensors which use phase sensitive OTDR techniques such as through the detection of coherent Rayleigh noise, or other interferometric techniques.

INTRODUCTION

Distributed optical fibre sensing is a well known approach to providing information about environmental conditions surrounding a sensing optical fibre, and avoids the need to use point sensor structures at particular locations such as sensor structures coupled to the optical fibre, or Bragg gratings written into the optical fibre. Fully distributed optical fibre sensing can, in principle, provide spatially resolved information from every point along the sensing optical fibre. Variables that can be sensed include temperature, static strain, pressure, and vibration.

One such technique detects variations in refractive index, induced by a physical forcing such as vibration, in the coherent Rayleigh noise profile of light backscattered within a sensing optical fibre interrogated by an optical source of limited bandwidth. Such Rayleigh noise profiles arise from interference between the many components of the backscattered light originating from different points along a portion of the sensing optical fibre illuminated by the optical source. Such techniques are described, for example, in WO2008/056143.

Another such technique detects variations in fibre temperature and strain through their effects on Brillouin scattering of probe light launched into the fibre, Such techniques are described, for example, in Horiguchi et al., Journal of Lightwave Technology, vol. 13, no. 7, July 1995.

It would be desirable to address problems and limitations of the related prior art.

SUMMARY OF THE INVENTION

The present invention provides methods and apparatus which can be used to increase the useful sensing coverage of an environment by a distributed optical fibre sensor, or other optical fibre based sensor, by permitting multiple sensing optical fibres to be interrogated concurrently, for example to detect an acoustic signal from the parts of the environment covered by the sensor.

The interrogation rate and acoustic bandwidth of a distributed optical fibre sensor detecting acoustic vibration based on time domain reflectometry (OTDR) principles are limited by the propagation delay for backscattered light to return from the far end of a sensing optical fibre after an interrogation probe light pulse is launched at the proximal end of the fibre. This is because the backscattered light being received at any instant in time must originate from only a single, known region of the sensing optical fibre in order to preserve the mapping from time to distance along the fibre. This requirement limits the maximum repetition rate of the probe light source used to generate the probe light pulses. The maximum acoustic bandwidth of such a sensor is limited by the Nyquist criterion, which requires that at least two samples of a signal waveform are required per cycle of the signal, if the frequency of the waveform is to be correctly represented. Thus the maximum acoustic signal frequency that can be correctly represented by an OTDR sensor is equal to half of the repetition rate of the launched probe light pulses. In some cases, when the length of sensing optical fibre is relatively small, the available acoustic bandwidth can exceed that required by a user, so that it might be possible to interrogate the sensing fibre at less than the maximum rate permitted by the length of the sensing optical fibre while still meeting the acoustic bandwidth requirement.

However, the distance range of a distributed optical fibre sensor based on optical time domain reflectometry (OTDR) principles is limited by the power budget of the system, which in turn is controlled by various factors, including the maximum permissible launched power of probe light pulses for avoidance of nonlinear optical effects in the sensing optical fibre, and the noise properties of the photo detection system. For a given optoelectronic system design, there is always a maximum length of fibre that can be interrogated with adequate signal to noise ratio. This can lead to requirements for additional interrogation systems to be provided if more fibre length needs to be monitored in an environment. Often, vibration monitoring is required at many physically separated points near to an interrogator, such that every point lies within the range limit of the system, but a single length of sensing optical fibre reaching all of the required locations may exceed the range limit for the interrogator because of the complex fibre path required to reach all of the locations to be monitored. Use of a single sensor fibre to monitor all the required locations in the environment may also lead to increased vulnerability to fibre damage.

The invention therefore provides sensor apparatus and methods which can be used to compromise between the distance range and sensing bandwidth limitations by sending sequential interrogation pulses along different optical fibre paths that are each within the range limit of the system, but whose aggregate length may far exceed that limit. Simultaneously, the probe light pulse repetition rate on each path can be lower than the maximum set by the round trip propagation time on each path, but can still be high enough to meet the Nyquist requirement for the desired sensing bandwidth. This approach optimizes the system performance while minimizing the number of interrogator units required, thus also minimizing the overall cost of the installation.

Prior art OTDR instruments are normally constructed such that the fibre being interrogated is connected directly to the interrogator unit. Backscattered light begins to enter the 'receive' path within the unit as soon as light from the 'transmit' path reaches the access component. Interrogation probe light pulses are normally generated at a fixed repetition rate, which is typically adjusted to match the length of the fibre under test.

In prior art distributed optical fibre sensing systems, when more than one sensing optical fibre is to be probed by a single interrogator, a 'one to many' mechanical optical switch is typically placed between the interrogator and the set of sensing optical fibres, and the switch settings are cycled so that each fibre is probed for a required measurement period. The pulse repetition rate of the interrogator will typically be fixed for all fibres. When one sensing fibre is being monitored, the others are ignored. The operation time of the switch is typically of the order of milliseconds and is normally not important, as the measurement period for each sensing fibre is normally relatively long, and may be of the order of seconds or minutes. These conditions typically apply in systems used for distributed measurement of fibre attenuation, temperature or strain. However, in the case of vibration or acoustic sensing, this approach will often not be acceptable, as important transient events may be missed. Embodiments of the present invention therefore use a fast, non-mechanical optical switch to direct each successive interrogation pulse to a different sensing optical fibre, for example in a cyclic sequence, such that the repetition rate of the probe light pulses in any sensing optical fibre always meets the Nyquist requirement for the required acoustic sensing bandwidth.

The optical switch operation time should ideally be short (of order tens of nanoseconds) compared to the length of an interrogation pulse, which may typically be of the order of 100 ns. The interrogator may then be designed to generate a repeating set of optical pulses where the interval between each pulse in the sequence is determined by the length of each individual sensing fibre within the set of fibres to be monitored.

Accordingly, the invention provides apparatus, such as a distributed optical fibre sensor, for measuring vibration, as a concurrent function of position along each of a plurality of sensing optical fibres, from properties of probe light backscattered within the sensing optical fibres, the sensor comprising:

a probe light source arranged to generate pulses of probe light for transmission to the sensing optical fibres;

a detector arranged to receive and detect probe light backscattered within the sensing optical fibres;

an optical switch arranged to switch between the sensing optical fibres, so as to direct each generated probe light pulse to a currently selected one of the sensing optical fibres, and to direct backscattered probe light from a currently selected one of the sensing optical fibres to the detector, such that all of the sensing optical fibres can be used concurrently to detect acoustic vibration; and an analyser arranged to determine vibration, as a concurrent function of position along each of the sensing optical fibres, from the detected backscattered probe light.

The invention may also be implemented in other types of fibre optic sensors, for example in which each sensing optical fibre comprises a plurality or array of Bragg gratings, and for detecting signals and parameters other than vibration or acoustic signals.

The apparatus may include a controller arranged to control the optical switch so as to interleave the generated probe light pulses to, and the direction of backscattered light to the detector from, the plurality of sensing optical fibres, such that all of the sensing optical fibres can be used concurrently to detect acoustic vibration. Typically also, each subsequent one of the generated probe light pulse may be directed to a different selected one of the plurality of the sensing optical fibres to the previously generated probe light pulse, for example in a recurring and cyclic fashion, although other switching schemes may be used.

The apparatus may be used to measure vibration as a concurrent function of position along each of the sensing optical fibres using coherent Rayleigh profiles detected in the backscattered probe light from each sensing optical fibre, although other techniques may be used for detecting vibration, and the apparatus may also or instead be used for detecting other parameters of the environment within which the sensing optical fibres are deployed.

In order to concurrently detect acoustic vibration at all of the sensing fibres, the apparatus may be arranged such that the optical switch returns to each of the sensing optical fibres at a frequency of at least 2 kHz, at least 5 kHz, at least 10 kHz, or at least 20 kHz, depending on the related upper limits of acoustic frequency which need to be detected. The apparatus may be arranged to return to one or more of the sensing optical fibres at a lower rate than for one or more others of the sensing fibres, where a lower acoustic detection bandwidth is acceptable. In order to minimise the time spent in switching from one fibre to another, and to thereby maximise the performance of the sensor in terms of length of fibre over which an acoustic signal is detected and in terms of repeat rate and therefore upper acoustic frequency, a solid state optical switch is preferably used.

Each sensing optical fibre may be deployed, to measure vibration in an environment, within a separate fibre optic cable. For example, each fibre optic cable may be deployed, at least partly, along a different path through the environment than the other fibre optic cables, so as to detect vibration in different parts of the environment than each of the other fibre optic cables. In this way, coverage of the environment by the optical sensor can be maximised in conjunction with maximising acoustic bandwidth.

In order to better cover required paths through or parts of an environment to be sensed, the sensor may be provided with at least three, or at least four sensing optical fibres. These sensing optical fibres could be deployed and interrogated, for example, so that the majority of the length of each fibre, or the majority of the length from which an acoustic signal is detected, is spaced by at least one metre from each other sensing optical fibre.

Conveniently, the lengths of at least two of the sensing optical fibres may also be different from each other, for example at least 10% different. However, whether or not the fibres are of different lengths, the apparatus may be configured to control the optical switch such that the duration of detection of backscatter of a probe light pulse received from a first of the sensing optical fibres is longer than the duration of detection of backscatter of a probe light pulse received from a second of the sensing optical fibres, and the analyser may then be correspondingly arranged to determine vibration along a greater length of the first of the sensing optical fibres than along the second of the sensing optical fibres. In this way, the available duty cycle of the detector may be used to detect an acoustic signal for lengths of sensing optical fibre which are of most interest, while maintaining an adequate overall detection bandwidth.

Similarly, in order to detect vibration over parts of sensing fibres of most interest, the apparatus may be configured to control the optical switch such that detection of backscatter from a second of the sensing optical fibres at least partly occurs between directing a probe light pulse to a first of the sensing optical fibres and at least partly detecting backscatter of the probe light pulse from the first sensing optical fibre.

The probe light pulses may be directed sequentially to the sensing optical fibres, for example using a cyclic and recurring sequence, such that a probe light pulse is directed to every one of the sensing optical fibres before a further probe light pulse is directed to any one of the sensing optical fibres. However, if higher bandwidth is required or lower bandwidth is acceptable for one or more sensing fibres, then probe light pulses may be sent more or less frequently to particular fibres. For example, following a probe light pulse being directed a first time to one of the sensing optical fibres, a probe light pulse may then be directed a second time to the same sensing fibre before probe light pulses have been directed to all of the other sensing optical fibres.

In order to use solid state optical switch elements with a limited ratio between the couplings on each side of the switch element, for example using 1×2 or 1×4 switch elements, the optical switch may comprise a cascade of such switch elements including a first layer switch element arranged to receive and direct probe light pulses to one or more further layers each of one or more switch elements, to thereby direct each probe light pulse to any one of the sensing optical fibres.

To reduce or eliminate problems associated with reflection of probe light pulses from the second and any further switch element layers, the cascade may be provided with or comprise a delay element, such as a suitable length of optical fibre typically provided as a coil, deployed between the first layer switch element and at least one switch element of a further layer. In this way, the delay element can be arranged to delay reflection of a probe light pulse from the switch element of the further layer back to the first layer switch element until the first layer switch element has completed transmission of the probe light pulse. This enables the first switch element to be redirected after passage of the probe light pulse, to block transmission of the reflection.

The use of an optical switch using a cascade of switch elements as set out above may more generally be used in an optical sensor for measuring one or more parameters, at one or more positions along each of a plurality of optical fibres, from properties of probe light returned from said one or more positions, the sensor comprising: a probe light source arranged to generate probe light pulses for transmission to the optical fibres; a detector arranged to receive and detect the returned probe light received from the optical fibres; an optical switch arranged to switch between the optical fibres, so as to direct each generated probe light pulse to a currently selected one of the optical fibres, and to direct returned probe light from a currently selected one of the optical fibres to the detector; and an analyser arranged to determine one or more parameters at said one or more positions from the detected returned probe light, wherein the optical switch comprises a cascade of switch elements including a first layer switch element arranged to receive and direct probe light pulses to one or more further layers each of one or more switch elements, to thereby direct each probe light pulse to one of the optical fibres. This aspect of the invention could be used, for example, in optical sensors which use discrete sensing elements such as Bragg gratings in the optical fibres, and can be used for detection of a variety of different parameters of an environment as well as or instead of acoustic vibration.

The invention also provides method corresponding to the above apparatus, for example a method of measuring vibration as a concurrent function of position along each of a plurality of sensing optical fibres, from properties of probe light backscattered within the sensing optical fibres, comprising: generating pulses of probe light for transmission to the sensing optical fibres; detecting probe light backscattered within the sensing optical fibres; switching between the sensing optical fibres, so as to direct each generated probe light pulse to a currently selected one of the sensing optical fibres, and to direct backscattered probe light from a currently selected one of the sensing optical fibres to the detector, such that all of the sensing optical fibres can be used concurrently to detect acoustic vibration; and determining a vibration signal, as a concurrent function of position along each of the sensing optical fibres, from the detected backscattered probe light.

BRIEF SUMMARY OF THE DRAWINGS

Embodiments of the invention will now be described, by way of example only, with reference to the drawings, of which.

DETAILED DESCRIPTION OF EMBODIMENTS

Figure 1:
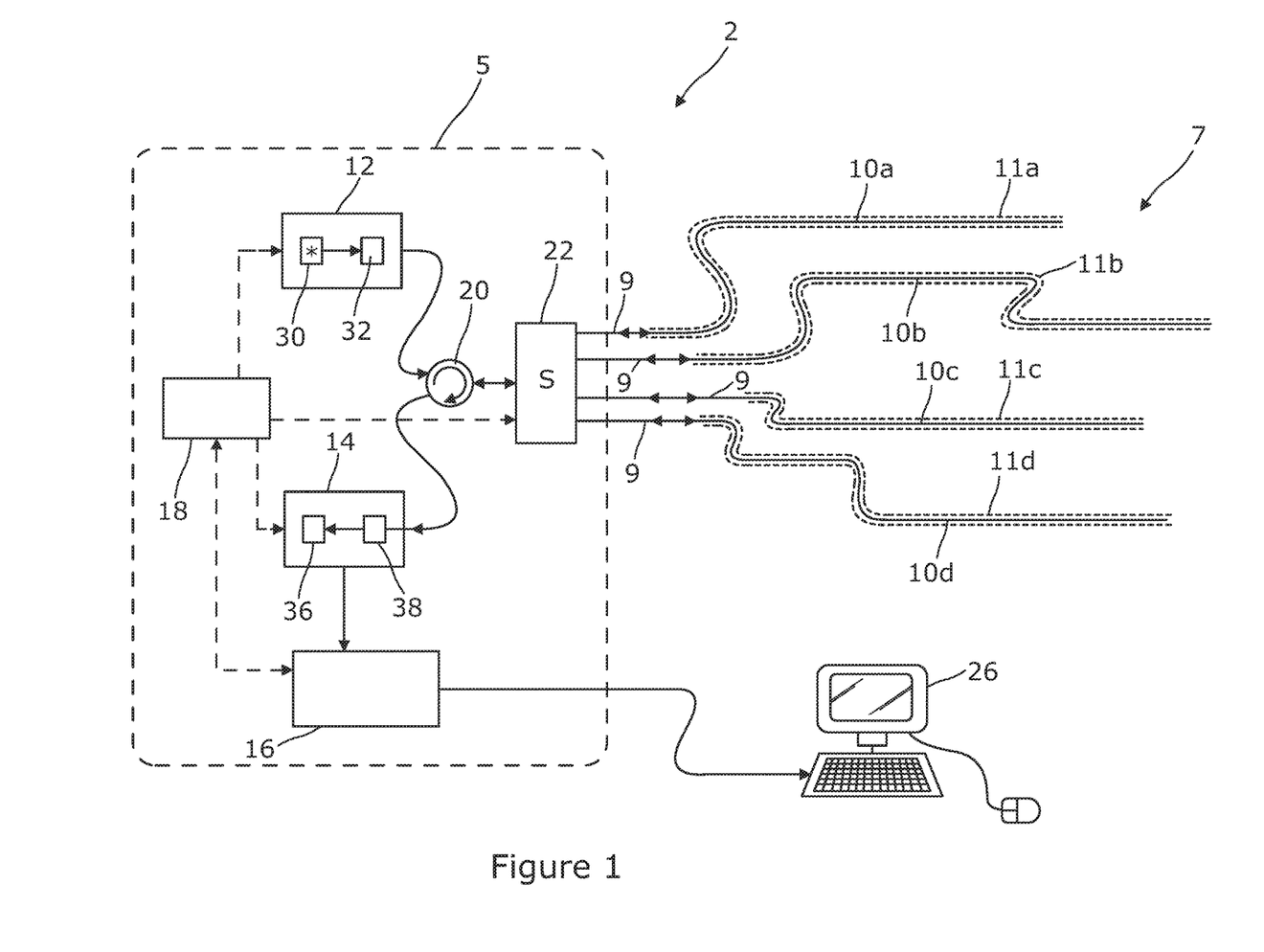
FIG. 1 shows schematically a distributed optical fibre sensor according to embodiments of the invention.

Referring to FIG. 1 there is illustrated a distributed optical fibre sensor 2 arranged to sense one or more physical parameters of an environment 7 as a function of position along part or all of each of a plurality of sensing optical fibres 10a-10d using optical time domain reflectometry (OTDR), or another reflectometry technique such as frequency domain reflectometry. An interrogator unit 5 of the sensor 2 includes a probe light source 12 for generating probe light pulses of suitable timing, shape and wavelength, a detector 14 for detecting probe light resulting from the probe light pulses being backscattered within the sensing fibres 10a-10d, and an analyser 16 for processing data, such as properties of the backscattered and detected light, which has been received from the detector 14.

The probe light source 12 forms probe light pulses which are forwarded to an optical circulator 20 and from there on to an optical switch 22. The optical switch 22 is arranged to couple each probe light pulse into a selected one of the sensing optical fibres 10a-10d, and to couple at least some of the corresponding backscattered light back to the optical circulator 20 for delivery to the detector 14. A controller 18 controls operation of the optical switch 22 to select which probe light pulse is delivered to which sensing optical fibre, and to ensure that backscattered light for detection and analysis is suitably directed to the detector 14. The controller 18 may also send control signals or data to the probe light source 12, in order to correctly coordinate timing of the optical switch 22 with timing of the probe light source 12, and to the detector 14 and/or analyser 16 to coordinate detection and analysis of the backscattered light. The controller 18 may also receive signals or data from the analyser 16, for example to control timing of the probe light source 12, optical switch 22 and or detector 14 based on properties of the detected backscattered light or parameters derived therefrom.

The analyser 16 generates and outputs analysis results based on the detected backscattered light, such as a determination of the one or more physical parameters of the environment 7, and in FIG. 1 this output is passed to a computer display 26, although various other types of output mechanism may be used. The analyser 16 may also pass data derived from the detected backscatter to the controller 18. The probe light source 12 contains one or more laser sources 30 to generate the probe light pulses. The probe light pulses are conditioned in the probe light source by one or more source optical conditioning components 32.

The detector 14 contains one or more detector elements 36 to detect backscattered light from the probe light pulses in the sensing optical fibres 10*a*-10*d*. The detector elements 36 may be, for example, suitable photodiodes. The backscattered light is conditioned in the detector using one or more detector optical conditioning components 38. The optical conditioning components 32, 38 in the probe light source 12 and in the detector 14 may include optical amplifiers, band pass filters, and other components.

The sensing optical fibres 10*a*-10*d* may all be of the same type, or may be of different types including, without limitation, single mode fibre, multimode fibre, fibre with high birefringence, and fibre especially adapted or encased so as to respond or enhance the response to changes in one or more of pressure, temperature, vibration, and other environmental parameters which are to be measured.

Each sensing fibre may be housed in a different fibre optic cable 11*a*-11*d*, which typically will provide physical protection to the housed sensing optical fibre, while coupling the optical fibre suitably to the environmental parameter to be sensed. In this way, each fibre optical cable, and therefore each sensing optical fibre may be deployed at least partly along a different path through the environment 7 to be sensed, so that each sensing optical fibre, at least in part, senses the one or more physical parameters in different parts of the environment to the other sensing optical fibres.

Using multiple sensing optical fibres in this way, instead of using a single sensing optical fibre to pass through the same parts of the environment to be sensed, enables shorter lengths of sensing optical fibre to be used to sense the one or more parameters in those parts of the environment. Using short lengths of sensing optical fibre allows lower optical powers to be used for the generated probe light pulses, increases signal to noise ratio in the backscattered probe light, enables continued use of the full lengths of others of the sensing optical fibres when a first sensing fibre has been damaged, and other benefits.

Two sensing optical fibres may be used, but in order to provide improved coverage of the environment as discussed above, the sensor may instead comprise at least three, or at least four such sensing optical fibres and/or optic fibre cables comprising the sensors.

Each sensing optical fibre 10*a*-10*d* may be coupled to the interrogator 5 by a length of down lead section 9 of the sensing optical fibre, which is not used for sensing the environment. This is illustrated schematically in FIG. 1 by different lengths of optical fibre before the respective cable 11*a*-11*d* is entered, but note that a down lead section 9 of a sensing optical fibre could also or instead be considered as a part of the sensing optical fibre which is housed within the respective fibre optical cable.

A variety of interrogation techniques may be used, for example depending on the parameters which are to be measured, and the probe light source 12, detector 14, sensing optical fibres 10*a*-10*d* and other components of the sensor 2 may be adapted accordingly. For example, the sensing fibres may be interrogated using techniques known in the prior art based on Rayleigh backscatter, coherent Rayleigh noise, Raman scattering, and Brillouin scattering. In some embodiments all of the sensing fibres are interrogated using the same technique, or the same combination of techniques, and in other embodiments different techniques or combinations of techniques are used on some or all of the sensing fibres. The sensor may use selected ones of these techniques as appropriate to measure parameters such as vibration, static or transient strain, temperature, and pressure.

Particular embodiments of the invention are adapted to measure acoustic vibrations, as a function of position concurrently along each of the sensing optical fibres 10*a*-10*d*, from properties of the probe light backscattered within the fibres, and detected at the detector 14. In order to achieve this, the optical switch 22 is controlled to interleave the probe light pulses between the sensing optical fibres, so that the pulse repetition rate in each sensing optical fibre is sufficient to meet repetition rate requirements for that fibre, noting that the pulse repetition rate may or may not be same for all fibres. If a particular upper frequency of acoustic vibration needs to be detected in a sensing optical fibre 10*a*-10*d* then, according to the Nyquist criterion, the pulse repetition rate for that fibre needs to be at least twice the upper frequency of vibration.

To maximise the time available for interrogation of each sensing optical fibre and therefore to optimize the length of fibre which can be interrogated and/or the highest acoustic frequencies which can be detected, an optical switch 22 with a switching time of the order of a few tens of nanoseconds or less should preferably be used, such as the model FOS120 or similar devices, for example from the Nanona™ range, from Boston Applied Technologies Inc. of Woburn, Mass., USA. Such switches typically use a solid state operation, without any physical movement being required to effect the switching action.

Vibration may be measured from the backscattered light in various ways, for example by detecting the effect of variations in refractive index of a sensing optical fibre, induced by the physical forcing of the vibration, on the coherent Rayleigh noise profile of the backscattered light. This may be achieved using probe light pulses of limited bandwidth. Such Rayleigh noise profiles arise from interference between the many components of the backscattered light originating from different points along a portion of the sensing optical fibre illuminated by the optical source. Such techniques are described, for example, in WO2008/056143.

In order to detect vibration at, say, 1 kHz in a particular sensing optical fibre, the sensor needs to send probe light pulses at a repeat rate of at least 2 kHz to that fibre, and similarly for higher required acoustic frequencies. The sensor may therefore be arranged, for example, such that the optical switch returns to each of, or to one or more of, the sensing optical fibres at a repeat rate of at least 2 kHz, at least 5 kHz, at least 10 kHz, or at least 20 kHz. Similarly, the sensor may be arranged for the optical switch to switch between the sensing optical fibres at a sufficient rate that acoustic signals of at least 1 kHz, at least 2.5 kHz, at least 5 kHz or at least 10 kHz to be detected concurrently in each of the sensing optical fibres.

Figure 2:
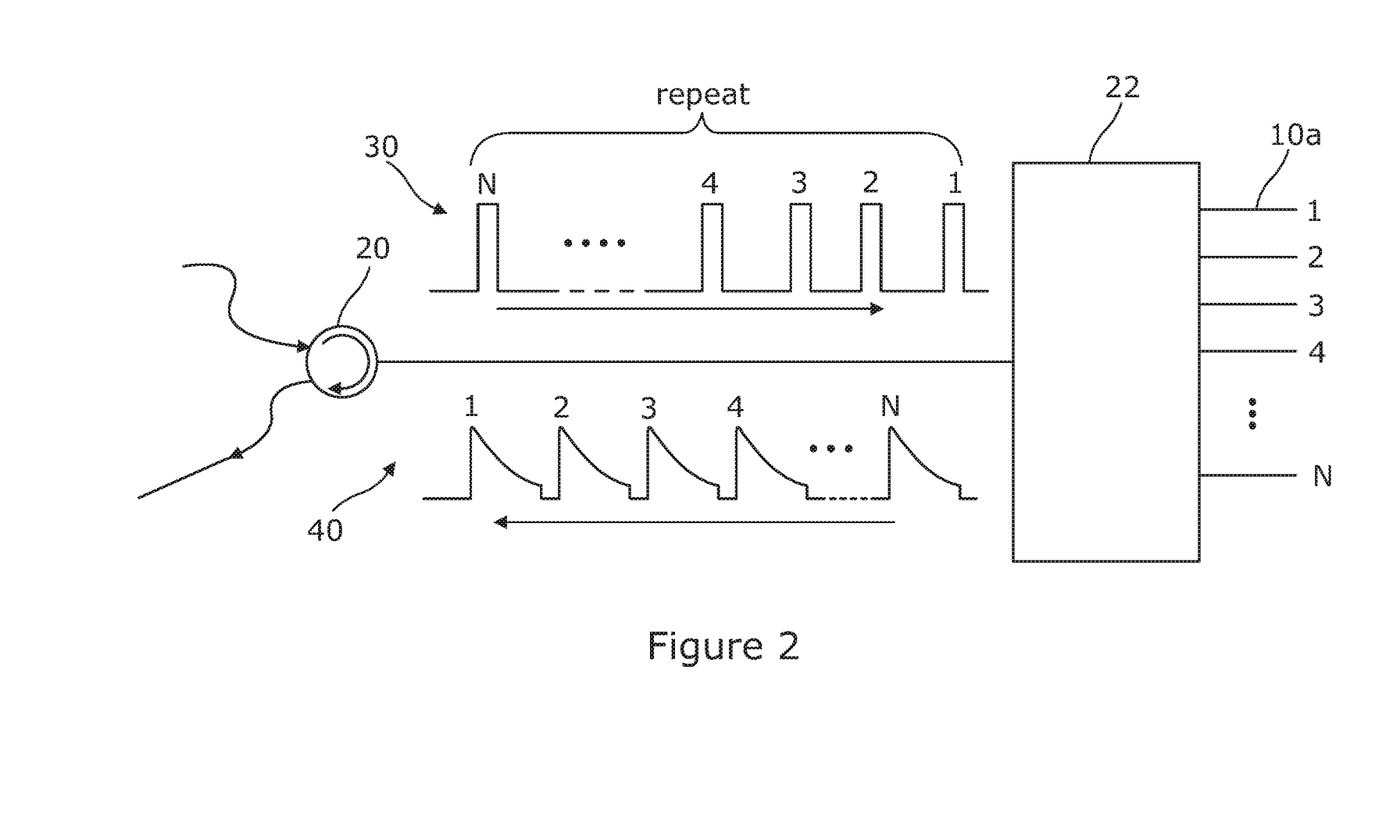
FIG. 2 illustrates a series of regularly spaced probe light pulses being routed by the optical switch to the sensing optical fibres, and the backscattered light being routed by the switch towards the detector.

FIG. 2 illustrates timing of probe light pulses 30 generated by the probe light source 12 as they are passed to the optical switch 22, and the timing of corresponding backscattered probe light 40 received from the optical switch 22, and therefore also timing of operation of the optical switch itself. In this example, the probe light pulses 30 are evenly spaced apart in time, and form a sequence which is repeated in a regular manner, each repetition corresponding to one duty cycle of the sensor. The labelling above each pulse indicates to which sensing optical fibre (numbered 1 . . . N in this figure) the probe light pulse will be directed by the optical switch 22, and from which sensing optical fibre the backscattered light has been received and passed by the optical switch 22 towards the detector 14. Immediately after launch of a probe light pulse 30 into the corresponding sensing optical fibre, the corresponding backscattered light 40 starts to be received at the optical switch. The intensity of this backscattered light 40 then decays over time as the point of backscatter becomes more distant along the fibre, and this decay is seen schematically in the curves of FIG. 2 representing the backscattered light 40. After a suitable time interval, the optical switch couples to a different sensing optical fibre, a new probe light pulse is optionally launched into that different sensing fibre, and backscattered light is now received from that different sensing fibre. In this way the switch sequentially selects each fibre in turn before repeating this cycle with the same ordering, and in this example, the dwell time of the switch is the same for each fibre. As a consequence, the backscattered light for each probe light pulse represents the same range of distance along each sensing optical fibre, whether or not the total length of each sensing optical fibre is the same.

In the example of FIG. 2, to achieve an exemplary maximum acoustic detection frequency of 20 kHz, a repetition rate in each sensing optical fibre of 40 kHz is required to satisfy the Nyquist criterion. If N=8 then a new probe light pulse must be generated and the optical switch redirected to a different one of the sensing optical fibres at a rate of 320 kHz, so that the interval between each probe light pulse 30 is approximately 3 microseconds. If the duration of a probe light pulse at launch is small compared with this interval (for example being about 100 nanoseconds), then the interval of time available for receiving and detecting backscatter corresponding to each pulse is also about 3 microseconds, assuming the speed of the switch is also sufficiently high (for example a few tens of nanoseconds). On this basis, each probe light pulse can be used to detect vibration along a sensing optical fibre to a furthest distance from the interrogator of about 330 metres, noting that the round trip distance is then 660 metres in a refractive index of about 1.5 for a typical optical fibre. Longer individual sensing optical fibres can be interrogated by reducing the number of separate fibres, or by reducing the repetition rate and thereby the highest detectable vibration frequency, so as to fit within the time budget for transmitting a probe light pulse into each fibre and having sufficient dwell time available to receive backscattered light from those parts of each fibre where sensing is required.

In practical applications, at least some of the sensing optical fibres may be of different lengths to each other, and/or detection of vibration in more distant parts of particular ones of the fibres might or might not be required. To optimize use of the duty cycle of the sensor 2, therefore, the timing of launch of the probe light pulses may be varied within the duty cycle along with corresponding changes in the dwell time of the switch at the different fibres. Using a longer dwell time and therefore allowing a longer interval of backscatter detection from a particular sensing optical fibre, including by delaying the next probe light pulse, enables backscattered light from further reaches of the currently selected sensing optical fibre to be detected. Of course, to achieve a particular maximum frequency of acoustic detection a particular repeat rate in each sensing optical fibre is required, so that lengthening the dwell time on one of the sensing optical fibres means reducing the total dwell time on the remaining fibres.

Figure 3:
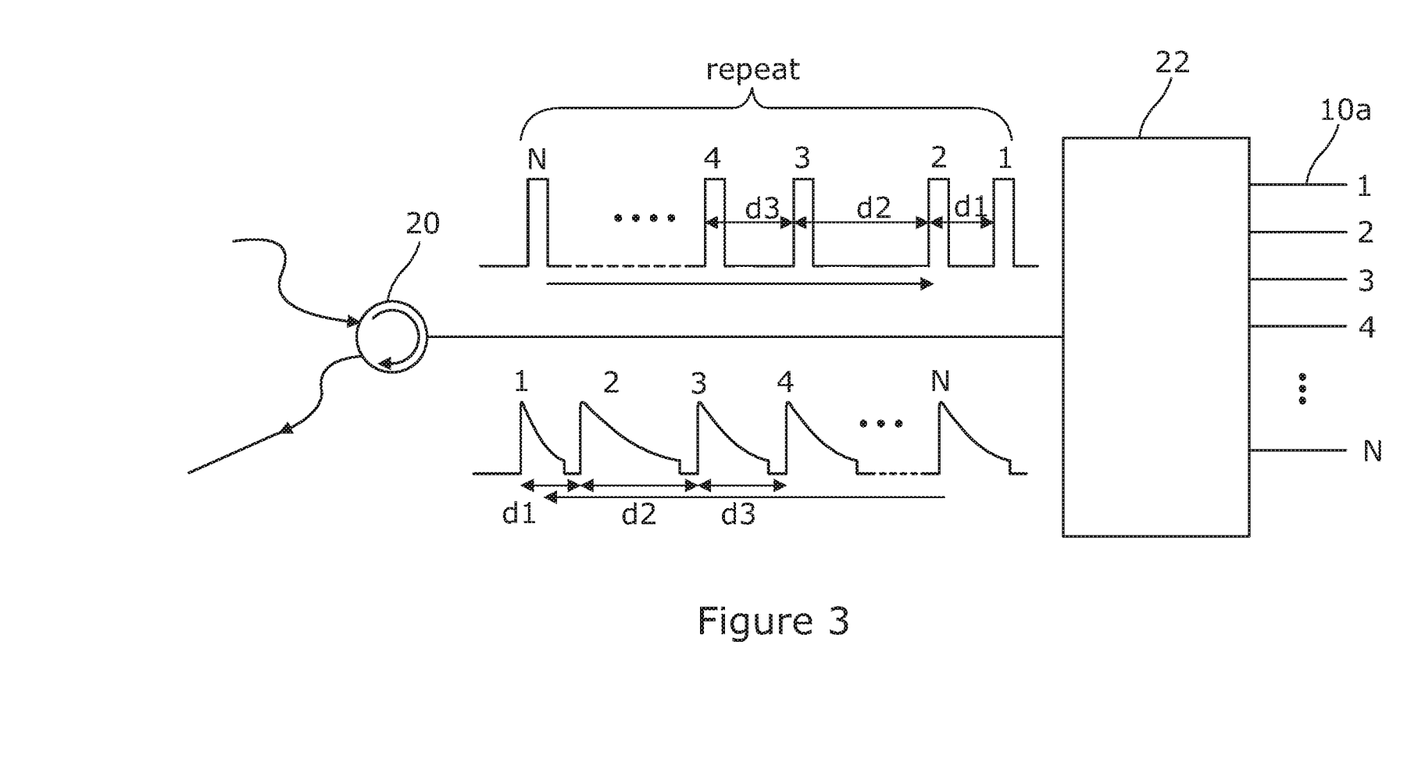
FIG. 3 is similar to FIG. 2 except that the dwell time of the optical switch varies between sensing optical fibres in order to detect an acoustic signal over correspondingly different lengths of the fibres.

Referring to FIG. 3, for example, it can be seen that the dwell time d1 on sensing optical fibre 1, and the corresponding delay before a probe light pulse is launched into the second optical fibre, is relatively short, the dwell time on fibre 2 is relatively long, and the dwell time on fibre 3 is intermediate between these two. Of sensing optical fibres 1-3, therefore under this scheme, vibration can be sensed with the greatest range along fibre 2, and the shortest range along fibre 1. Of course, the controller 18 can be used to control the dwell time of the switch 22 on each sensing optical fibre 10a-10d, along with the launch time of each corresponding probe light pulse 30 and the operation of the detector 14 and interrogator 16 to provide sensing to chosen distances along each sensing optical fibre as desired for particular circumstances. This technique can be combined with any of the other switching schemes described herein.

For a practical example where the total length of sensing optical fibre to be interrogated is 3000 metres, the maximum repetition rate is then about 33 kHz, leading to an upper frequency of detected vibration of about 16.5 kHz. The 3000 metres of optical fibre, however, can be distributed in different proportions across the plurality of sensing optical fibres as required by the particular circumstances. For example, one sensing optical fibre could be interrogated to a distance of 1500 metres from the interrogator, and three other sensing fibres could each be interrogated to a distance of 500 metres, with each sensing optical fibre being interrogated with the same rate of repetition.

In the arrangements of FIGS. 2 and 3, in a particular duty cycle the optical switch 22 cycles in sequence through each of the sensing optical fibres, with detection of backscatter in a first sensing optical fibre taking place before launch of probe light into a second. However, in order to provide acoustic detection in different parts of some of the fibres, especially at further distances from the interrogator, the sensor 2 may be configured to control the optical switch such that detection of backscatter from a first of the sensing optical fibres, of an earlier generated probe light pulse, at least partly occurs after directing of a later generated probe light pulse to a second of the sensing optical fibres. More generally, the switch may be controlled such that detection of backscatter from a second of the sensing optical fibres at least partly occurs between directing a probe light pulse to a first of the sensing optical fibres and at least partly detecting backscatter of the probe light pulse from the first sensing optical fibre. This technique may be used, for example, when one or more of the sensing optical fibres is installed with a considerable down lead length 9 where sensing is not required, or in more complex situations.

Figure 4:
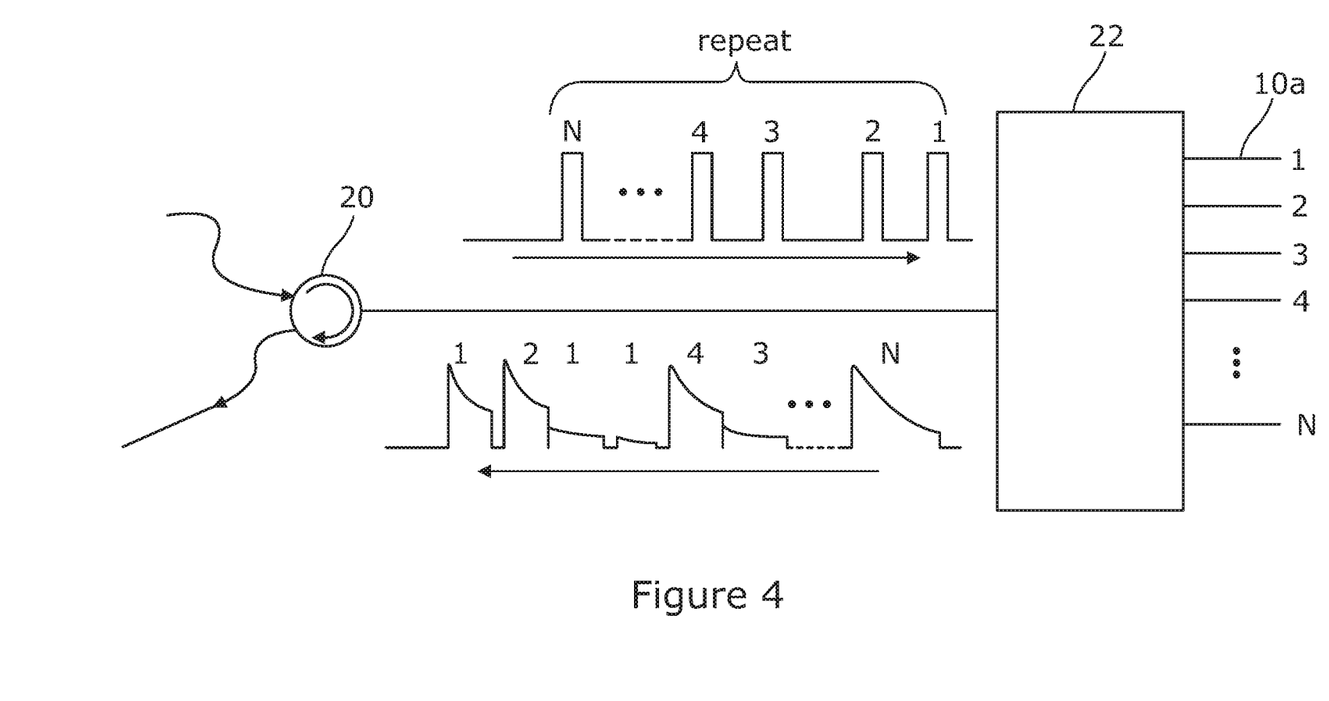
FIG. 4 shows how the optical switch can be used to receive backscattered light using a different ordering or sequence of the sensing optical fibres to the ordering of the transmitting of the probe light pulses into the fibres, for example in this case to receive probe light from distant regions of fibres 1 and 3 without using duty cycle unnecessarily on the closer regions of these fibres.

The technique is illustrated in FIG. 4, in which the optical switch dwells on sensing optical fibre 1 for the launch of a probe light pulse and to receive a period of backscatter from that first fibre, then dwells on sensing optical fibre 2 for the launch of a probe light pulse and to receive a period of backscatter from that second fibre, then returns to dwell on sensing optical fibre 1 to receive further backscatter from a more distant region of that sensing optical fibre. The optical switch then dwells briefly on sensing optical fibre three to permit launch of a probe light pulse into that fibre before returning to dwell for a further period of backscatter detection from sensing optical fibre 1. The switch then dwells for a period on a fourth sensing optical fibre to launch a further probe light pulse and detect backscatter from that fourth pulse, before returning to detect backscatter from the third sensing optical fibre.

In the scheme illustrated in FIG. 4, the sensor 3 is able to detect backscatter from more distant regions of particular sensing optical fibres, while still maintaining an adequate repetition rate for each fibre and therefore an acceptable highest acoustic frequency of detection. This is achieved at the expense of not detecting backscatter from one or more less distant regions of one or more of the sensing optical fibres, which may in any case not be of interest to the end user. By configuring the sensor to return to the sensing optical fibre of a previously launched probe light pulse, the user is therefore able to select different regions of the sensing optical fibres for interrogation and acoustic detection. This technique can be combined with any of the other switching schemes described herein.

A practical example could be where the total length of sensing optical fibre connected to the interrogator, including down lead lengths 9, is 4000 metres, but a maximum repetition rate of about 31 kHz is still required to achieve an upper frequency of detected vibration of about 15.5 kHz. Backscatter from only 3000 metres of sensing optical fibres can be received within the 31 kHz duty cycle, but this could include using two probe light pulses launched into first and second fibres at about the same time in order to interrogate the first 1000 metres of the first fibre and the second 1000 metres of the second fibre, followed thereafter by a further probe light pulse launched to interrogate the first 1000 metres of a third fibre.

Figure 5:
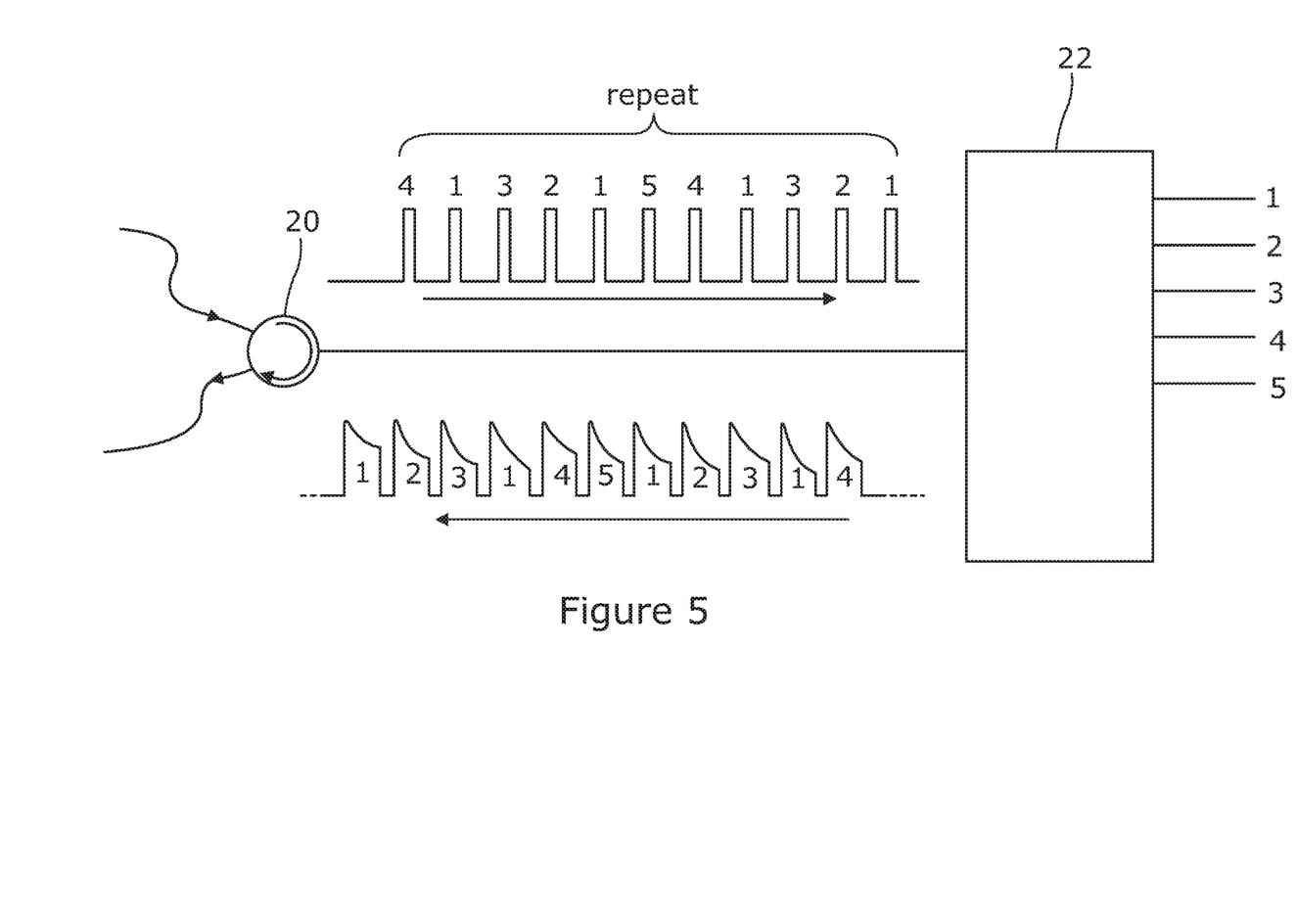
FIG. 5 shows how the optical switch can be used to interrogate different ones of the sensing optical fibres at different repeat rates, for example in this case with fibre 1 having double and fibre 5 having half the repeat rates of fibres 2, 3 and 4.

In the arrangements of FIGS. 2, 3 and 4, the optical switch 22 is used to direct probe light pulses sequentially to the sensing optical fibres within a duty cycle such that a probe light pulse is directed to each one of the sensing optical fibres before the duty cycle repeats and a further probe light pulse is directed to any one of the sensing optical fibres. However, the sensor 2 may also be configured to direct probe light pulses more, or less frequently to particular fibres. In the arrangement of FIG. 5, for example, a probe light pulse is directed to the first sensing optical fibre twice as often as to fibres 2, 3 and 4, and a probe light pulse is directed to the fifth sensing optical fibre only half as often as to fibres 2, 3 and 4. Accordingly, the repetition rate for the first fibre within the duty cycle, and therefore the maximum detectable acoustic frequency will be twice that for fibres 2, 3 and 4. The repetition rate and therefore the maximum detectable frequency for the fifth fibre will similarly be half that for fibres 2, 3 and 4. In this way, the sensor 2 can be configured to provide a higher repeat rate where needed in particular fibres, and a lower repeat rate in other fibres where adequate for the required purposes.

This technique can be combined with any of the other switching schemes described herein. More generally, although the switching schemes described above may operate using a regular repetition of a particular sequence of sensing optical fibres, irregular schemes may also or instead be used, for example to provide acoustic detection which gives a statistically correct detection of acoustic vibration over longer intervals. Similarly, the described apparatus can be controlled to interrogate only a subset of the sensing optical fibres, or to periodically switch between different subsets and/or all of the sensing optical fibres for interrogation to determine an acoustic signal for each such fibre. Similarly, the apparatus can be arranged to change, periodically or from time to time, the region(s) of one or more of the sensing optical fibres which are interrogated to determine an acoustic signal. Such control of which sensing optical fibres and which parts of such fibres are interrogated may be implemented at least in part, if required, using an adaptive scheme in which such decisions are made upon the basis of parameters detected by the sensing optical fibres, for example upon the basis of acoustic signals already detected.

The various schemes outlined above for controlling the optical switch 22 and probe light source 12 to carry out sensing in various combinations of the sensing optical fibres and parts of these fibres may be implemented using suitable algorithms included within the controller 18. These algorithms could be implemented in hardware, in software, or in a combination of both. For example, such algorithms could be implemented using a microprocessor with associated memory, or using a field programmable gate array, provided as part of controller 18, and optionally also as part of analyser 16.

A sequence of switching actions such as those implied by FIGS. 2-5 or as otherwise discussed above may be defined as data in a memory of the controller 18, and these switching actions performed by the optical switch as a repeated cycle either on the basis of a fixed switching rate, or using fixed or varied switching times also defined by data in the memory. Data defining a cycle of switching actions and timings for those actions could include switching to each sensing optical fibre once, multiple times, or different numbers of times to different sensing optical fibres if different repeat rates are required.

Data in a memory of the controller 18 for controlling the switching actions may instead or also define control steps for each of multiple switch elements provided for example as part of a cascade forming the optical switch, as discussed below.

Optical switch elements are most commonly used in telecommunication systems for purposes such as route provisioning, failure recovery and system reconfiguration. In most of these applications, switching times of the order of milliseconds are regarded as adequate, and reconfiguration events are relatively rare. This permits the majority of switch elements to be based on mechanical technology. Mechanical designs can deliver switch elements with large numbers of input and output ports in a single device. Also, reflections from such switch elements are typically well controlled, and can be in the range of −50 dB compared to the transmitted light. Since optical communication links are typically unidirectional on a single fibre, reflections can also be suppressed, if necessary, by the use of optical isolators, which act as 'one way' transmission components.

Figure 6:
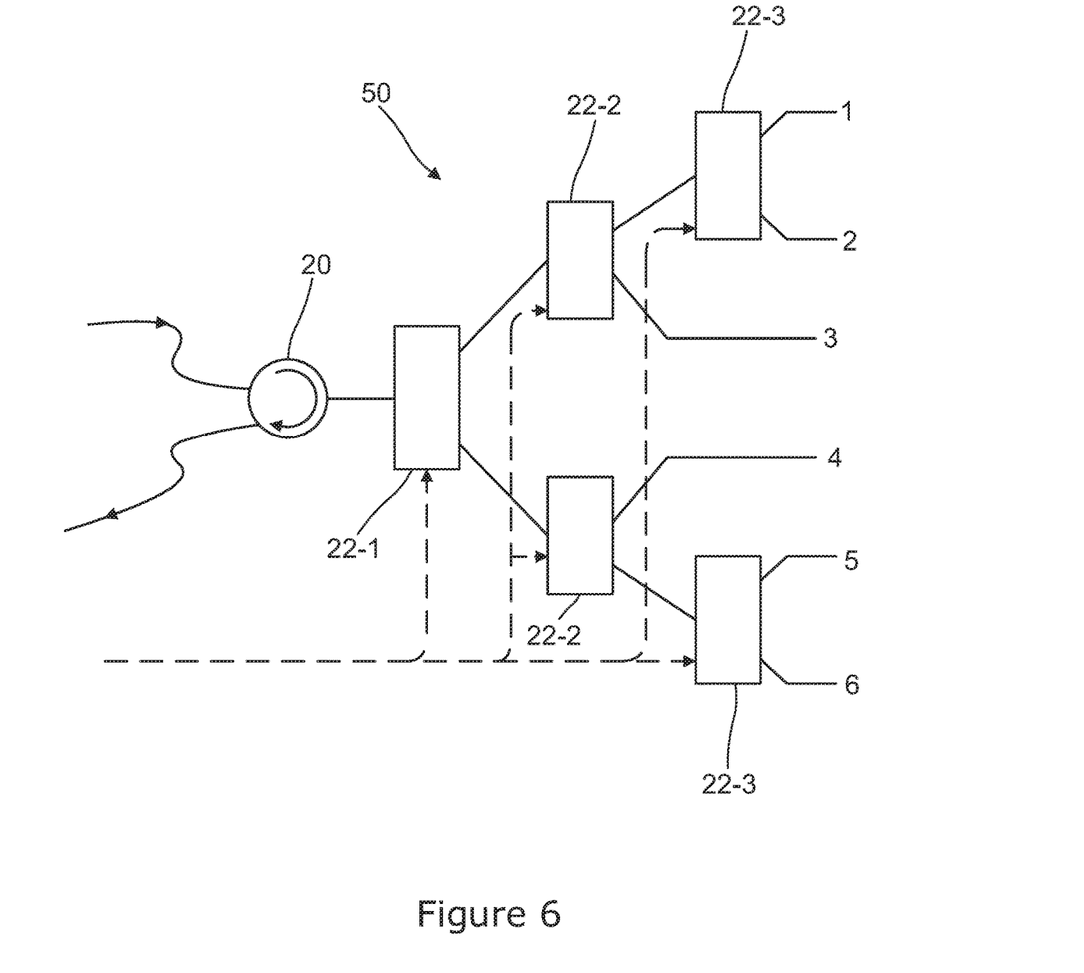
FIG. 6 shows the use of a cascade of optical switch elements to form the optical switch of FIGS. 1 to 5.

By contrast, optical switch elements having the speed necessary to implement the arrangements described above rely on non-mechanical technologies and are typically available in only a 1×N configuration of inputs and outputs, with relatively few outputs and with N even. Commercially available devices may have N less than or equal to 4. An example of a candidate switch element that is commercially available is the model FOS120 from Boston Applied Technologies already mentioned above. This particular switch element provides a 1×2 switching configuration, with switching time of the order of 60 ns. If this switch element is used to provide the optical switch 22 of FIG. 1, but more sensing optical fibres need to be interrogated, then such switch elements may be cascaded as shown in FIG. 6, which shows the optical switch 22 of FIG. 1 provided by a cascade 50 with three layers of 1×2 optical switch elements. The single switch element of the first layer is labelled 22-1, the two switch elements of the second layer are labelled 22-2, and the two switch elements of the third layer are labelled 22-3, thereby providing a maximum of six outputs although not all of these need be used to connect to sensing optical fibres. Different numbers of sensing optical fibres can be accommodated using different types of optical switch element (1×2, 1×4 etc.), different numbers of cascade layers, and different numbers of optical switch elements in each layer, with the cascade comprising at least a first layer switch element 22-1 and one or more further layers each of one or more switch elements, the first layer switch element being arranged to pass at least some of the probe light pulses to the one or more further layers to thereby route the probe light pulses to the plurality of sensing optical fibres.

Each switch element may be controlled separately by the controller 18 of FIG. 1, as shown by the broken lines in FIG. 6, to achieve the correct routing and correct timing from the circulator 20 to the required sensing optical fibre, or a separate switch controller (not shown) could be used, for example under the control of the main controller 18.

The main practical limiting factors for the size of the optical switch 22 provided by cascade 50 are switch attenuation and return loss (i.e. switch reflection). Switch attenuation may be partially compensated for by increasing the output power of the probe light source 12. For the switch element type quoted above, the insertion loss is specified to be <1 dB. This can be acceptable in many practical circumstances. The switch element type quoted here is specified to have a return loss of better than 55 dB, which is comparable to mechanically based optical switch elements. However, interrogation systems for distributed acoustic or vibration sensing typically operate with very low levels of Rayleigh backscattered light arriving at the interrogator, and even quite low values of reflected power from the optical switch elements 22-1, 22-2 etc. can compromise system performance, for example by reducing the performance of optical amplifiers in the detector 14. It would therefore be desirable to avoid the accumulation of multiple reflections arising from the optical switch elements of the cascade 50.

In typical telecommunications systems, optical isolators might be used to avoid the reflections, but this technique cannot be applied here because the interrogation system necessarily employs bidirectional propagation of the probe light in the sensing optical fibres and the optical switch cascade 50. However, accumulation of reflections may be circumvented by taking advantage of the fact that in order to achieve a suitably fine spatial resolution of parameter detection, the probe light pulses are very short and instantaneously occupy only a relatively short length of optical fibre. For a typical case where each probe light pulse is 100 ns in length, each pulse occupies only about 20 m of fibre.

Figure 7:
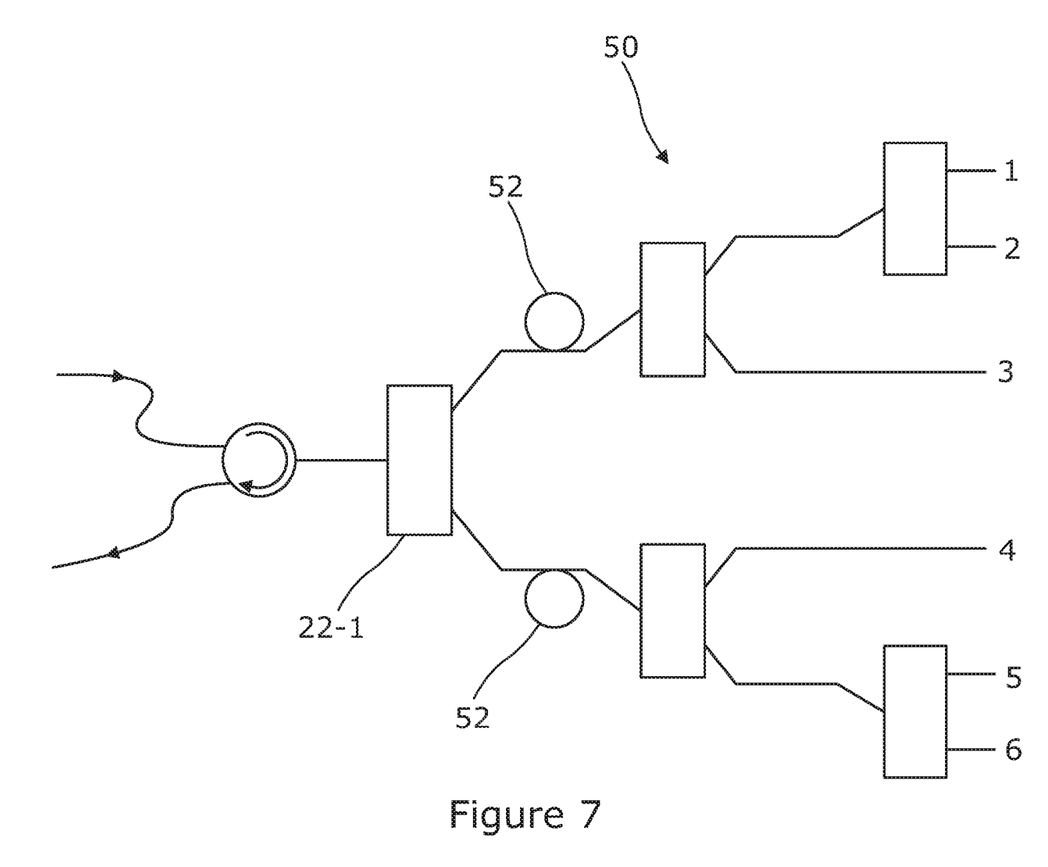
FIG. 7 illustrates the use of delay elements between the first and second layers of the cascade of FIG. 6 in order to delay reflection of probe light pulses back from the second layer, allowing time for the first layer switch to be redirected to block passage of the reflection to the detector.

The reflection from the first switch element 22-1 in the cascade 50 cannot be easily suppressed, but reflections from further layers can be suppressed by using delay elements 52 in the fibre optical couplings between pairs of switch elements, and most usefully between the optical switch element 22-1 of the first layer and the optical switch element 22-2 of the second layer as shown in FIG. 7. These delay elements 52 can easily be provided by a coil of optical fibre of a suitable length. If the delay introduced by a delay element 52 is more than about half of the pulse length, then the layer 1 switch can be directed away from the transmission path immediately after transmitting the probe light pulse, thereby blocking reflections from later switch elements 22-2 etc. which would otherwise return through the layer 1 switch element 22-1 to the detector 14. The layer 1 switch element 22-1 can be returned to the transmission path shortly after any reflections from the later switch elements have been received and blocked, ready to transmit backscattered light from the sensing optical fibre which received the probe light pulse.

For the example of a 100 ns pulse given here, a 10 metre delay coil, or slightly longer to allow for switching delays, or another delay element of equivalent optical length, could be adequate since the probe light pulse and its reflection has to make both the forward and reverse journeys through the delay coil before there is any entry into the receiving chain of the detector 14.

Likewise, other strong reflections from the sensing optical fibres 10a-10d, including from any down lead lengths 9, splices and other features or defects, that might temporarily degrade the performance of the detector 14, can be gated out by briefly redirecting the cascade 50 to block passage of the reflection, which will typically last for a period similar to the duration of the probe light pulse.

It should be noted that the use of a cascade 50 or optical switch elements and delay elements described above may be advantageous in any optical fibre sensing system aimed at detecting rapid variations in sensed parameters, and is not necessarily restricted to OTDR methods or vibration sensing. For example, arrays of multiplexed, point optical fibre sensors such as fibre Bragg gratings could be implemented at one or more positions along each sensing optical fibre.

Figure 8A:
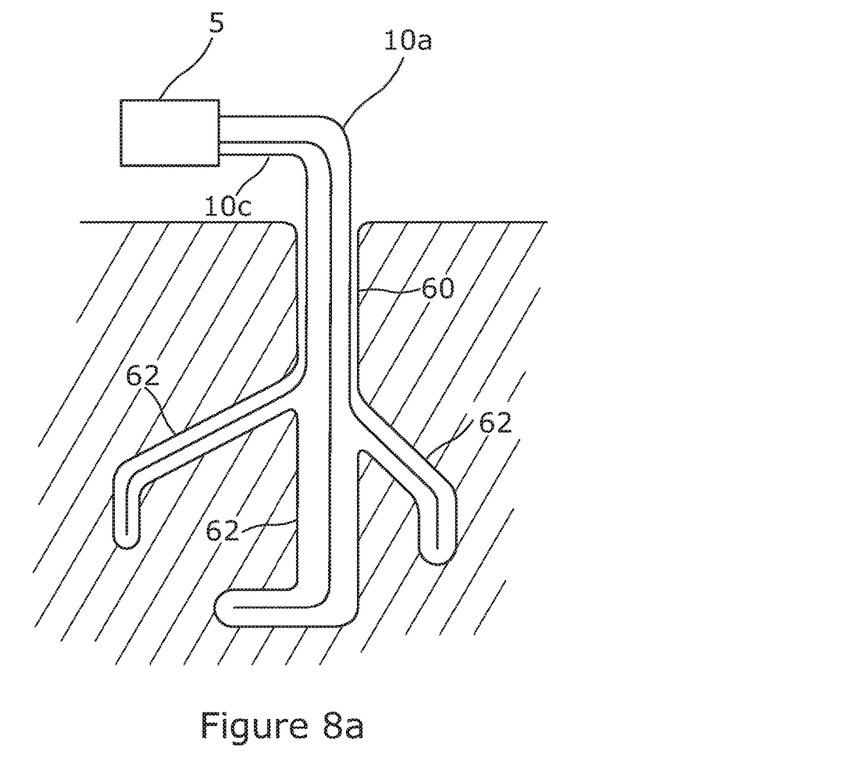
FIGS. 8A and 8B show exemplary applications of the sensor of FIGS. 1 to 7.

The methods and arrangements described above can be used in a variety of situations. FIG. 8a illustrates the sensor being used to monitor multiple pathways through a geological environment, and in particular branches of a geological borehole 60, such as an oil or gas well. Each branch 62 is monitored using a different one of the sensing optical fibres 10a-10c. Typically, each sensing optical fibre may be installed within a separate fibre optic cable as already shown in FIG. 1, although other installation techniques are possible. The techniques discussed above can be used in this situation in various ways. For example, the total length of the sensing optical fibres 10a-10c may be too long to permit full acoustic sensing over the full length of each fibre with an adequate acoustic bandwidth. Then, instead of using multiple interrogator units 5, the user may still use a single interrogator unit 5 coupled to all of the sensing optical fibres, by limiting the regions of the sensing optical fibres for which an acoustic signal is detected, using the techniques described above. For example, the single interrogator could be used to detect an acoustic signal from only within the branches 62 of the borehole, or in other regions of particular interest.

Figure 8B:
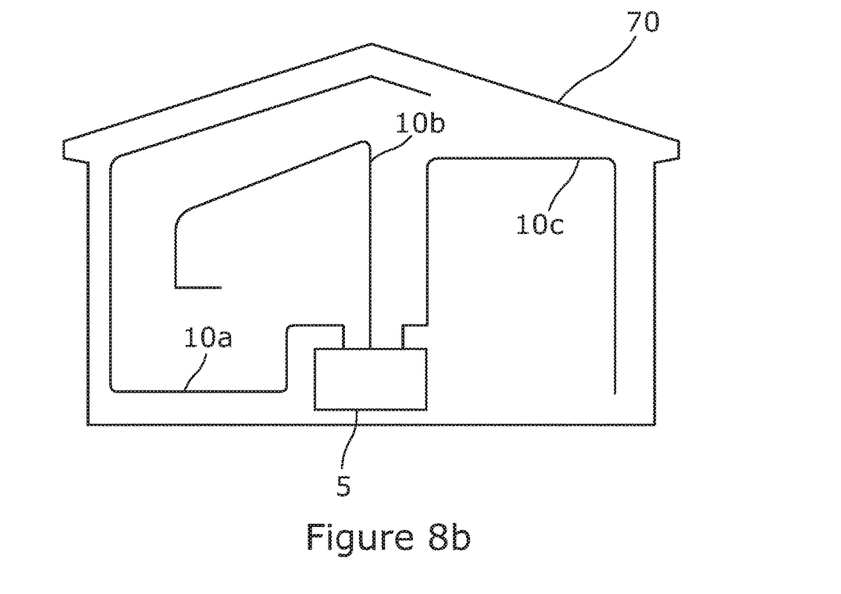

In FIG. 8b, the sensor is being used to monitor along different pathways within a built structure 70, such as a building, bridge, pipeline or similar. Again, each sensing optical fibre may be deployed in a separate fibre optic cable and detect parameters of the environment such as acoustic vibration in different parts of the built structure to the other sensing optical fibres. The invention can be of benefit in this situation in multiple different ways. For example, the total length of sensing optical fibre which needs to be deployed to cover certain parts of the built structure 70 may be reduced by using multiple sensing optical fibres instead of a single sensing optical fibre which has to be deployed in a geometry to reach all of the parts. Also, the total length of a single or multiple deployed sensing optical fibres may be too great to permit acoustic sensing over the full length of each fibre at an adequate upper level of acoustic frequency. The techniques described above can then be used to detect an acoustic signal in those parts of the environment which are of primary interest, while still using a single interrogator unit.

Various modifications may be made to the described embodiments without departing from the scope of the invention, which is defined by the appended claims. For example, although the techniques described above have been largely illustrated in the context of OTDR (optical time domain reflectometry) and DOFS (distributed optical fibre sensor) arrangements used to detected acoustic or vibrational signals, they may be advantageously used in any optical fibre sensing system aimed at detecting rapid variations in sensed parameters using multiple optical fibres. For example, multiple optical fibres each having an array of multiplexed, point optical fibre sensors such as fibre Bragg gratings could be interrogated using the schemes described in this above.

The invention claimed is:

1. A distributed optical fibre sensor for measuring acoustic vibration, as a concurrent function of position along each of a plurality of sensing optical fibres, from properties of probe light backscattered within the sensing optical fibres, the sensor comprising:
   a probe light source arranged to generate pulses of probe light for transmission to the sensing optical fibres;
   a detector arranged to receive and detect probe light backscattered within the sensing optical fibres;
   an optical switch arranged to switch between the sensing optical fibres, so as to direct each generated probe light pulse to a currently selected one of the sensing optical fibres, and to direct backscattered probe light from a currently selected one of the sensing optical fibres to the detector, the sensor being configured to control the optical switch such that all of the sensing optical fibres can be used concurrently to detect acoustic vibration by controlling the switch to return to each of the sensing optical fibres at a frequency of at least 2 kHz; and
   an analyser arranged to measure acoustic vibration, as a concurrent function of position along each of the sensing optical fibres, from the detected backscattered probe light.

2. The distributed optical fibre sensor of claim 1 further comprising a controller arranged to control the optical switch as to interleave the generated probe light pulses to, and the direction of backscattered light to the detector from, the plurality of sensing optical fibres, such that all of the sensing optical fibres can be used concurrently to detect acoustic vibration.

3. The distributed optical fibre sensor of claim 1 wherein each subsequent one of the generated probe light pulses is directed to a different selected one of the plurality of sensing optical fibres to the previously generated probe light pulse.

4. The distributed optical fibre sensor of claim 1 wherein each sensing optical fibre is deployed, to measure acoustic vibration in an environment, within a separate fibre optic cable.

5. The distributed optical fibre sensor of claim 4 wherein each fibre optic cable is deployed, at least partly, along a different path through the environment than the other fibre optic cables, so as to measure acoustic vibration in different parts of the environment than each of the other fibre optic cables.

6. The distributed optical fibre sensor of claim 5, wherein the majority of the length of each sensing optical fibre is spaced by at least one metre from each other sensing optical fibre.

7. The distributed optical fibre sensor of claim 5, wherein the majority of the length of each sensing optical fibre from which an acoustic signal is detected is spaced by at least one metre from each other sensing optical fibre.

8. The distributed optical fibre sensor of claim 1 wherein the lengths of at least two of the sensing optical fibres are substantially different.

9. The distributed optical fibre sensor of claim 1 comprising at least three said sensing optical fibres.

10. The distributed optical fibre sensor of claim 1 configured to control the optical switch such that the duration of detection of backscatter of a probe light pulse received from a first of the sensing optical fibres is longer than the duration of detection of backscatter of a probe light pulse received from a second of the sensing optical fibres, and the analyser is correspondingly arranged to determine vibration along a greater length of the first of the sensing optical fibres than along the second of the sensing optical fibres.

11. The distributed optical fibre sensor of claim 10 configured such that a dwell time of the optical switch at the first of the sensing optical fibres is greater than a dwell time of the optical switch at the second of the sensing optical fibres.

12. The distributed optical fibre sensor of claim 1 configured to control the optical switch such that detection of backscatter from a second of the sensing optical fibres at least partly occurs between directing a probe light pulse to a first of the sensing optical fibres and at least partly detecting backscatter of the probe light pulse from the first sensing optical fibre.

13. The distributed optical fibre sensor of claim 1 configured such that the probe light pulses are directed sequentially to the sensing optical fibres such that a probe light pulse is directed to each one of the sensing optical fibres before a further probe light pulse is directed to any one of the sensing optical fibres.

14. The distributed optical fibre sensor of claim 1 configured such that following a probe light pulse being directed a first time to one of the sensing optical fibres, a probe light pulse is then directed a second time to the same sensing fibre before probe light pulses have been directed to all of the other sensing optical fibres.

15. The distributed optical fibre sensor of claim 14 whereby backscattered light is detected from one of the sensing optical fibres at least twice as often as from one of the other sensing optical fibres.

16. The distributed optical fibre sensor of claim 1 wherein probe light pulses are directed into at least two different ones of the sensing optical fibres at different repetition rates for each of the at least two different ones of the sensing optical fibres.

17. The distributed optical fibre sensor of claim 1 arranged to measure vibration as a concurrent function of position along each of the sensing optical fibres using a coherent Rayleigh profile of the backscattered probe light.

18. The distributed optical fibre sensor of claim 1 arranged for the optical switch to switch between the sensing optical fibres at a sufficient rate that acoustic signals of at least 5 kHz can be detected concurrently in each of the sensing optical fibres.

19. The distributed optical fibre sensor of claim 1 wherein the optical switch comprises a cascade of switch elements including a first layer switch element arranged to receive and direct probe light pulses to one or more further layers each of one or more switch elements, to thereby direct each probe light pulse to any one of the sensing optical fibres.

20. An optical sensor for measuring one or more parameters, at one or more positions along each of a plurality of optical fibres, from properties of probe light returned from said one or more positions, the sensor comprising:
- a probe light source arranged to generate probe light pulses for transmission to the optical fibres;
- a detector arranged to receive and detect the returned probe light received from the optical fibres;
- an optical switch arranged to switch between the optical fibres, so as to direct each generated probe light pulse to a currently selected one of the optical fibres, and to direct returned probe light from a currently selected one of the optical fibres to the detector, the optical sensor being arranged to control the optical switch to return to each of the optical fibres at a frequency of at least 2 kHz; and
- an analyser arranged to determine one or more parameters at said one or more positions from the detected returned probe light,
- wherein the optical switch comprises a cascade of switch elements including a first layer switch element arranged to receive and direct probe light pulses to one or more further layers each of one or more switch elements, to thereby direct each probe light pulse to one of the optical fibres.

21. The optical sensor of claim 20 further comprising a delay element between the first layer switch element and at least one switch element of a further layer, the delay element being arranged to delay reflection of a probe light pulse from the switch element of the further layer back to the first layer switch element until the first layer switch element has completed transmission of the probe light pulse.

22. The optical sensor of claim 21 arranged to redirect the first layer switch element, to block transmission of the reflection, after completing transmission of the probe light pulse.

23. A method of measuring acoustic vibration as a concurrent function of position along each of a plurality of sensing optical fibres, from properties of probe light backscattered within the sensing optical fibres, comprising:
- generating pulses of probe light for transmission to the sensing optical fibres;
- detecting probe light backscattered within the sensing optical fibres;
- switching between the sensing optical fibres, so as to direct each generated probe light pulse to a currently selected one of the sensing optical fibres, and to direct backscattered probe light from a currently selected one of the sensing optical fibres to the detector, such that all of the sensing optical fibres can be used concurrently to detect acoustic vibration, by switching to return to each of the sensing optical fibres at a rate of at least 2 kHz; and
- measuring acoustic vibration, as a concurrent function of position along each of the sensing optical fibres, from the detected backscattered probe light.

24. The method of claim 23 further comprising deploying each sensing optical fibre, to measure acoustic vibration within an environment, housed within a separate fibre optic cable deployed at least partly along a different path through the environment to the other fibre optic cables.

25. The method of claim 23 comprising switching between the sensing optical fibres such that the duration of detection of backscatter of a probe light pulse received from a first of the sensing optical fibres is longer than the duration of detection of backscatter of a probe light pulse received from a second of the sensing optical fibres, and the analyser is correspondingly arranged to determine vibration along a longer portion of the first of the sensing optical fibres than along the second of the sensing optical fibres.

26. The method of claim 23 comprising:
- controlling the optical switch such that detection of backscatter from at least a portion of a second of the sensing optical fibres occurs between directing a probe light pulse to a first of the sensing optical fibres and detecting backscatter of the probe light pulse from at least a portion of the first sensing optical fibre; and
- determining vibration for the portions of the first and second sensing optical fibres from the detected backscatter.

27. The method of claim 23 comprising:
- directing a probe light pulse a first time to one of the sensing optical fibres; and then
- directing a probe light a second time to the same sensing fibre before directing probe light pulses to all of the other sensing optical fibres.

28. The method of claim 23 comprising:
- using a cascade of optical switch elements to provide the optical switch;
- providing at least one optical delay element between a first and second layer of the cascade to delay reflection of probe light pulse energy from the second to the first layers; and
- redirecting the first layer of the cascade before arrival of reflection of probe light pulse energy from the second layer.

29. The method of claim 23 wherein the vibration signals are determined from coherent Rayleigh backscatter of the probe light pulses from the sensing optical fibres.

30. The distributed optical sensor of claim 19 further comprising a delay element between the first layer switch element and at least one switch element of a further layer, the delay element being arranged to delay reflection of a probe light pulse from the switch element of the further layer back to the first layer switch element until the first layer switch element has completed transmission of the probe light pulse.

* * * * *